United States Patent Office 2,752,389
Patented June 26, 1956

2,752,389

PREPARATION OF ESTERS OF 5-CHLORO-3-PENTEN-1-OL AND 3-CHLORO-4-PENTEN-1-OL

Theodore E. Bockstahler, Moorestown, N. J., assignor to Rohm & Haas Company, Philadelphia, Pa., a corporation of Delaware No Drawing. Application November 7, 1952,
Serial No. 319,407

4 Claims. (Cl. 260—497)

This invention relates to the esters of 5-chloro-3-penten-1-ol and 3-chloro-4-penten-1-ol and to their preparation. It relates to the preparation of esters, particularly to mixtures of the isomeric esters, which have the following structural formulas:

RCOOCH₂CH₂CH=CHCH₂Cl
and
RCOOCH₂CH₂CH(Cl)CH=CH₂ in which R represents a hydrogen atom or a methyl or ethyl group.

These esters are believed to be new compounds. They are particularly valuable because they are readily convertible to glycols by couplings, hydrogenation and hydrolysis. The glycols in turn are converted to dibasic acids by oxidation. The coupling of these unsaturated, chlorinated esters is the subject of an application for Letters Patent, Serial No. 319,408, filed November 7, 1952, now U. S. Patent No. 2,669,579, issued February 16, 1954.

The chlorinated and unsaturated esters of this invention are prepared by the process which comprises reacting, under anhydrous conditions and in the presence of an acidic catalyst, 1,3-butadiene, formaldehyde, hydrogen chloride and either formic, acetic or propionic acid. The process gives rise to a mixture of isomeric chlorinated and unsaturated esters and takes the course represented as follows:

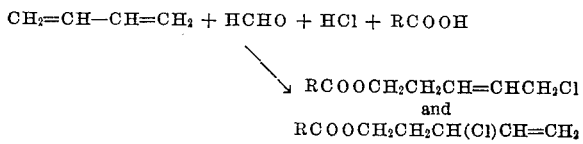

The reaction is carried out under anhydrous conditions and at a temperature from 0°–50° C.—preferably from 15°–30° C.

Since substantially anhydrous conditions must be maintained, formalin is not employed. Consequently, formaldehyde per se, or derivatives such as paraformaldehyde, trioxane and methylal which are the equivalents of, and which provide, formaldehyde are used. As is evident from the above equation, the formaldehyde and butadiene react in equimolar amounts.

Similarly, the hydrogen chloride reacts in the ratio of one mole per mole of butadiene and must be present in at least that ratio. Here, however, it is suggested that a slight excess over this ratio be employed in order to accelerate the chemical reaction shown above and to assure the formation of the chlorinated isomeric esters.

Although the formic, acetic or propionic acids also combine in the same one-to-one ratio it has been found advantageous to employ an excess. Consequently, a ratio of at least 1.5 moles, and preferably 1.5 to about 4 moles, of the acid to one of butadiene is employed. The organic acid can even be used in such a large excess as to serve as the solvent for the reaction mixture and can be removed later from the reaction products as a salt or by distillation.

The hydrogen chloride and butadiene should always be present at the same time in order to avoid the formation of by-products. Thus, all of the reactants can be mixed at the outset, or the butadiene and hydrogen chloride can be pre-mixed and the resultant mixture added to the other reactants, or, preferably, the butadiene and hydrogen chloride are added simultaneously to the reaction mixture. In the preferred procedure, the hydrogen chloride and butadiene are added to the reaction mixture at such a rate that they are absorbed immediately thereby and do not escape in any significant amount therefrom.

Acidic catalysts which have been used successfully include sulfuric, phosphoric and p-toluenesulfonic acids as well as Friedel-Crafts catalysts typified by the halides of aluminum, boron, titanium, tin and zinc. The amount of catalyst may vary depending upon the operating conditions and the particular catalyst employed but in general from about 0.1 to about 30% based on the weight of butadiene is recommended. Combinations of catalysts work particularly well such as the following: 10 parts of zinc chloride and 2 parts of sulfuric acid; 10 parts of zinc chloride and 1 to 20 parts of p-toluenesulfonic acid; and the like. When methylal is used as the source of formaldehyde, very good results are obtained by using sulfuric acid or phosphoric acid alone as catalyst.

It is important that all of the reactants be intimately mixed and for this reason vigorous agitation is most desirable.

The following examples serve to illustrate the process of this invention. All parts are by weight.

Example 1

A mixture of 500 parts of glacial acetic acid, 40 parts of zinc chloride, 2 parts of aluminum chloride and 126 parts of 95.5% paraformaldehyde (equivalent to 4 moles of HCHO) was rapidly agitated and held at 25° C. with external cooling while into it was passed four moles of butadiene and 4.5 moles of hydrogen chloride at the rate of approximately one mole of each per hour over a period of four hours. Water was then added to the reaction mixture and the organic layer which formed was separated, was washed thoroughly with water and a dilute aqueous solution of sodium bicarbonate, was dried and finally fractionally distilled under reduced pressure. A 28% yield was obtained of the fraction which boiled at 78°–87° C./12 mm. Analysis established that the product was a mixture of the chloropentenyl acetates whose structure is shown above.

Example 2

A mixture of isomeric chloropentenyl formates was obtained in a 30% yield when 98–100% formic acid was substituted for the acetic acid in the process of Example 1 above. The mixture boiled at 75°–87° C./8 mm.

In a similar way, by using propionic acid for the acetic acid of Example 1, a 15% yield was obtained of a mixture of the isomeric chloropentenyl propionates boiling at 100°–130° C./8 mm.

Example 3

An alternative method was conducted as follows: A container cooled in a Dry-Ice bath was charged with 2.6 moles of formic acid, one mole of paraformaldehyde, one mole of butadiene, 1.1 moles of hydrogen chloride, a small amount of hydroquinone, zinc chloride (3.7% based on weight of butadiene) and aluminum chloride (0.2% based on weight of butadiene). The container was sealed and then rotated for 24 hours at 25° C. after which the contents was treated with water and worked up as described in Example 1.

The same procedure was followed employing, respectively, acetic and propionic acids. The quantity of by-products produced was invariably lower by this procedure than by the procedure described above and the yields of the chloropentenyl formates, acetates or propionates made thereby were in most instances from 40 to 45% of theory.

A mixture of isomeric chloropentenyl formates, acetates or propionates is always produced by the process of this invention. And while the individual isomers can be separated by fractional distillation if desired, for many purposes, however, the mixtures of isomers are used as prepared, as, for example, in the preparation of polyhydric alcohols and polybasic acids.

I claim:

1. A process for the preparation of a mixture of the isomeric esters having the formulas $$RCOOCH_2CH_2CH=CHCH_2Cl$$
and
$$RCOOCH_2CH_2CH(Cl)CH=CH_2$$

in which R is a member of the class consisting of a hydrogen atom, a methyl group and an ethyl group, which comprises reacting, at a temperature below 50° C. and under anhydrous conditions, and in the presence of an acidic catalyst, a mole of butadiene, a mole of formaldehyde, at least one mole of hydrogen chloride and at least one mole of an acid, RCOOH, in which R has the significance described above.

2. A process for the preparation of a mixture of the isomeric esters having the formulas $$CH_3COOCH_2CH_2CH=CHCH_2Cl$$
and
$$CH_3COOCH_2CH_2CHClCH=CH_2$$

which comprises reacting, under anhydrous conditions and at a temperature of 0°–50° C. in the presence of an acidic catalyst, a mole of butadiene, a mole of formaldehyde, at least one mole of hydrogen chloride and at least one mole of acetic acid.

3. A process for the preparation of a mixture of the isomeric esters having the formulas $$HCOOCH_2CH_2CH=CHCH_2Cl$$
and
$$HCOOCH_2CH_2CHClCH=CH_2$$

which comprises reacting, under anhydrous conditions and at a temperature of 0°–50° C. in the presence of an acidic catalyst, a mole of butadiene, a mole of formaldehyde, at least one mole of hydrogen chloride and at least one mole of formic acid.

4. A process for the preparation of a mixture of the isomeric esters having the formulas $$CH_3CH_2COOCH_2CH_2CH=CHCH_2Cl$$
and
$$CH_3CH_2COOCH_2CH_2CHClCH=CH_2$$

which comprises reacting, under anhydrous conditions and at a temperature of 0°–50° C. in the presence of an acidic catalyst, a mole of butadiene, a mole of formaldehyde, at least one mole of hydrogen chloride and at least one mole of propionic acid.

References Cited in the file of this patent

UNITED STATES PATENTS 2,443,409   Whitner _____ June 15, 1948

FOREIGN PATENTS 687,497   Great Britain _____ Sept. 19, 1951

OTHER REFERENCES

D'Yakonov: Chem. Abstracts v. 34 (1940), 7861 (4).